United States Patent [19]

Skelton et al.

[11] 3,745,548
[45] July 10, 1973

[54] DIODE MONITORING SYSTEMS
[75] Inventors: Jon V. Skelton; Alfred E. Relation, both of Philadelphia, Pa.
[73] Assignee: ESB Incorporated, Philadelphia, Pa.
[22] Filed: Sept. 28, 1971
[21] Appl. No.: 184,347

[52] U.S. Cl............................ 340/253 E, 340/248 E
[51] Int. Cl. .............................................. G08b 21/00
[58] Field of Search .................... 340/248 E, 253 R, 340/253 E; 317/52, 43; 321/11, 14

[56] References Cited
UNITED STATES PATENTS
3,172,093  3/1965  Diebold............................ 340/253 E
3,099,828  7/1963  Kelley, Jr. ........................ 340/248 E
2,398,366  4/1946  Emley .............................. 340/253 E FOREIGN PATENTS OR APPLICATIONS
704,746  3/1954  Great Britain ................... 340/253 E Primary Examiner—John W. Caldwell
Assistant Examiner—Daniel Myer
Attorney—Robert H. Robinson et al.

[57] ABSTRACT

An apparatus for monitoring a rectifier leg which forms a part of a system that is being supplied with electrical power from an external circuit. The rectifier leg has at least first and second series connected rectifier cells. The monitor apparatus includes a source of control power for supplying electrical power to the monitor apparatus as well as to the rectifier leg. The monitor apparatus provides an indication of open and short circuit failure of the rectifier cells while they are in use in the system and being supplied with electrical power from the external circuit or while they are being supplied with electrical power solely by the source of control power of the monitor apparatus.

4 Claims, 2 Drawing Figures

INVENTORS.
JON V. SKELTON
ALFRED E. RELATION

DIODE MONITORING SYSTEMS

BACKGROUND OF THE INVENTION

1. Field of the Invention

The present invention relates to apparatus for monitoring the operation of rectifiers or the like. More particularly, the invention relates to apparatus for monitoring and providing to an observer an indication of short or open circuit failure of rectifiers. Further, the present invention relates to any rectifying device, hereinafter alternatively referred to as a rectifier cell, and could include the normal rectifier elements and, with proper modification, controlled rectifiers or thyristors, mercury arc rectifiers, chemical cells and the like. With these latter type rectifier cells, appropriate gate drive circuits would necessarily be included.

2. Description of the Prior Art

It may be explained that, generally, it is desirable in the case of high power systems utilizing rectifier cells to provide means for monitoring the operation and for detecting any failures of the various rectifier cells employed in the system. Generally, there are two modes of rectifier cell failure, namely open circuit failure and short circuit failure.

The monitoring of rectifier cells is well known. Monitoring arrangements have been heretofore provided which sense current or temperature to provide an indication of rectifier cell failure. A disadvantage of such monitor arrangements is that with them, the monitoring for rectifier cell failure is possible only when the rectifier cells are conducting. Consequently, in arrangements wherein current or temperature is sensed, the monitoring of the rectifier cells for open circuit mode failure is not possible. In certain high power systems, as for example, in a system wherein a critical load must be supplied with power at all times, an open circuit mode failure would tend to be more disasterous than a short circuit mode failure and, as stated, open circuit mode failure cannot be detected by arrangements which sense current or temperature.

SUMMARY OF THE INVENTION

Briefly, and in accordance with the invention, there is provided in a system comprising a rectifier leg including at least first and second series connected rectifier cells and an external circuit arranged to supply electrical power to the rectifier leg, a monitor apparatus for providing an indication of open and short circuit failure of the rectifier cells while they are in use in the external circuit.

The invention will be better understood by reference to the following description and the appended drawings which are electrical diagrams of a non-limitative embodiment of the invention.

DESCRIPTION OF THE PREFERRED EMBODIMENT

Figure 1:
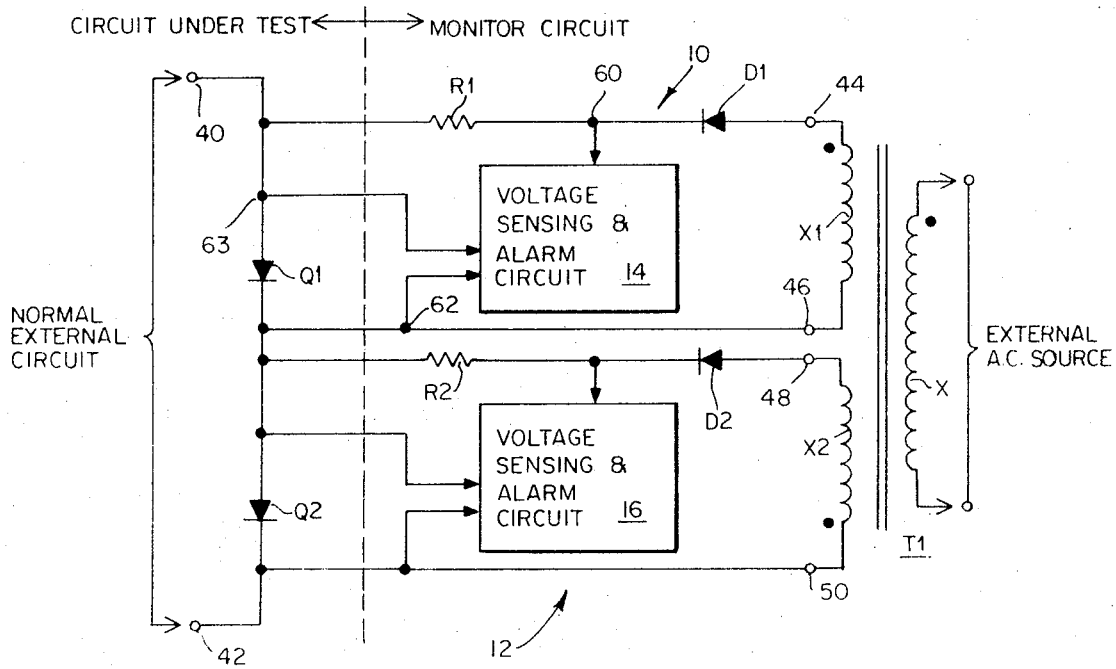
FIG. 1 is a schematic diagram partially in block form illustrating monitoring apparatus according to the invention as applied to a series diode configuration which may form a part of a power system.

Referring now to FIG. 1, there is illustrated a branch of a rectifier circuit comprising a pair of diodes connected in series and identified by the reference characters Q1 and Q2. The diodes Q1 and Q2 may form a part of any external circuit and may be arranged to conduct current or be arranged to block reverse voltage or alternatively and/or simultaneously be serving both of these functions with respect to the external circuit..

As will be understood to those skilled in the art, either of the diodes Q1 or Q2 may become inoperative to serve its intended function at anytime for any number of reasons and, consequently, it is desirable to continuously monitor the condition of each individual diode while it is idle, conducting current or blocking voltage.

To this end, each of the diodes Q1, Q2 have individual monitor circuits which are generally designated by the numerals 10 and 12.

Each of the monitoring circuits 10, 12 is substantially identical. They differ only in the fact that the secondary windings X1, X2 of the transformer T1, which supplies control power for the monitoring circuits 10, 12 are of opposite polarity to each other.

The monitoring circuit 10 comprises the secondary winding X1, the diode D1, resistor R1 and the voltage sensing and alarm circuit 14. The monitoring circuit 12 comprises the secondary winding X2, the diode D2, resistor R2 and the voltage sensing and alarm circuit 16. Each of the voltage sensing and alarm circuits 14 and 16 are identical and one will hereinafter be described in detail with reference to FIG. 2, however, in order to provide a foundation for the detailed description of the voltage sensing and alarm circuit, the overall operation of the monitoring circuits 10, 12 will now be given.

Briefly, alternate monitoring of each of the diodes Q1, Q2 is accomplished by measuring the forward voltage drop of one of the diodes Q1, Q2 during a time when it is conducting, or caused to conduct, current and giving an alarm, either visual or audible, if this measured voltage drop is lower or higher than a predetermined reference voltage. A voltage lower than the predetermined reference voltage would result from a short circuit mode failure, and a voltage higher than the predetermined reference would result from an open circuit mode failure. During the time interval in which the voltage drop across one of the diodes Q1, Q2 is being measured, the other diode of the pair is permitted to block any reverse voltage applied to the series configuration of Q1 and Q2.

More specifically, operation of the monitoring circuits 10, 12 is as follows: Assuming the diodes Q1 and Q2 comprise a series configuration of diodes used in any external circuit between terminals 40 and 42. The diodes Q1, Q2 may be conducting current, in which case terminal 40 is positive with respect to terminal 42. When an external source of AC power is applied to the primary X of transformer T1, the voltage of the external source is transformed to a proper value on the transformer's secondary windings X1 and X2. Assuming that a half cycle of AC power of the external source initially results in terminal 44 of secondary winding X1 becoming positive with respect to terminal 46 of secondary winding X1; then because the secondary winding X2 is of opposite polarity to the secondary winding X1, the terminal 48 of secondary winding X2 will become negative with respect to terminal 50 of secondary winding X2. The diodes D1 and Q1 will become forwarded biased and current will flow in the monitoring curcuit 10 through diode D1, resistor R1, diode Q1 from terminal 44 to terminal 46. The resistor R1 limits this current. At this time, monitoring circuit 12 is disabled because diode D2 is reversed biased and blocks the voltage applied from the secondary winding X2 of transformer T1; therefore diode Q2 is free to conduct current or block the voltage of the external circuit between terminals 40 and 42.

The voltage sensing and alarm circuit 14 is powered by the voltage appearing between point 60 and the point 62 which latter point is electrically the same point as terminal 46 of secondary winding X1. The forward voltage drop of diode Q1, that is, the voltage appearing between points 63 and 62 is measured by the voltage sensing and alarm circuit 14. If the voltage measured at this time is lower or higher than a predetermined reference voltage, the voltage sensing and alarm circuit will produce an alarm signal.

During the next half cycle of the external source that is applied to the transformer T1, monitoring circuit 10 will be disabled for the reason that, during this next half cycle, diode D1 is reversed biased and blocks the applied voltage of the secondary winding X1 of transformer T1; therefore diode Q1 is free to conduct current or block the voltage of the external circuit between terminals 40 and 42. During this next half cycle of the external source, monitoring circuit 12 will become energized in the same manner that monitoring circuit 10 was energized in the previous half cycle, and the operation of monitoring circuit 12 is the same as the operation of monitoring circuit 10.

From the foregoing it will be understood that since each monitor circuit 10, 12 is identical, but out of phase, during alternate half cycles of the external source that is applied to the transformer T1, the forward voltage drops of both Q1 and Q2 are alternately monitored for proper value at the frequency of the external source applied to transformer T1.

Figure 2:
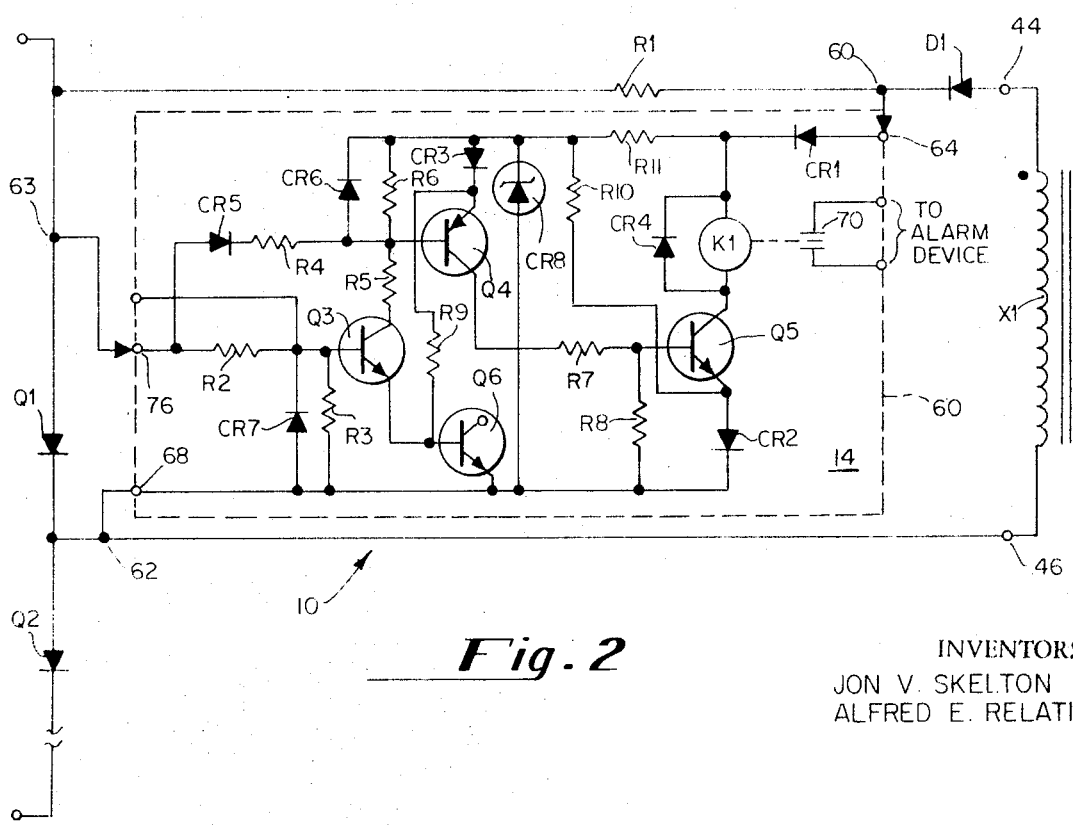
FIG. 2 is a schematic diagram illustrating an embodiment of the monitoring circuit of the invention together with one diode of the series diode configuration of FIG. 1.

The voltage sensing and alarm circuits 14, 16 can take many forms. They are each a voltage measuring and comparison circuit which can effect an alarm when the voltage sensed by it is lower or higher than a predetermined reference voltage. An example of such a circuit is shown in FIG. 2.

As both of the voltage sensing and alarm circuits 14, 16 are identical only one of them will be described. The voltage sensing and alarm circuit shown in FIG. 2 is that used to monitor the diode Q1. The voltage sensing and alarm circuit 14 is preferably mounted on a printed circuit board represented by the dashed line 60 in FIG. 2.

In considering the operation of the monitor circuit 10, and again assuming that a half cycle of AC power of the external source initially results in the terminal 44 being positive with respect to the terminal 46 of the secondary winding X1, then rectified half wave power, the rectification being due to diode D2, is applied between terminals 64 and 68 of the printed circuit board 60; the Diode Q1 will also be in a conducting state. The voltage appearing across terminals 64 and 68 will energize relay K1 if switching transistor Q5 is turned on. Therefore a loss of this voltage, or if transistor Q5 is turned off, will cause relay K1 to become de-energized. De-energization of relay K1 will effect the operation of the contacts 70 which in turn are adapted to be connected to or form a part of an energizeable audible alarm device which will provide an alarm upon failure of the diode Q1.

From the foregoing it will be understood that relay K1 comprises an energizing means for effecting the energization of the alarm device. The switching transistor Q5 is operable between a normally closed circuit condition (turned on) wherein the relay is ineffective to effect operation of the alarm device, and an open circuit condition (turned off) wherein the relay is effective to effect operation of the alarm device.

The remaining portions of the monitoring circuit 10, in effect, comprises a switch operating means for transistor Q5 for operating the transistor Q5 in response to the voltage drop across diode Q1 differing a predetermined amount from a preselected reference voltage.

Now continuing with the description of monitoring circuit 10, the diodes CR2 and CR3 are simply biasing diodes. The resistors R10 and R9 are "keep alive" resistors which supply current to the biasing diodes CR2 and CR3. The transistor Q6 is connected as a diode and is used as a diode voltage reference. Regulated voltage is supplied to the transistors Q3,Q4 by Zener diode CR8 and dropping resistor R11.

For normal operation during Q1's conduction period (during the positive half cycle under consideration), Q1 will exhibit a normal voltage drop of approximately 0.7 v. This voltage appearing across terminals 76 and 68 appears across the resistor bridge comprised of resistors R2, R3 and is sufficient to turn transistor Q3 on. With transistor Q3 on, transistor Q4 base current flows turning transistor Q4 on. Transistor Q4 base current is limited by resistor R5. Transistor Q4 collector current then flows through limiting resistor R7 and turns transistor Q5 on which energizes relay K1. As stated, this is during a normal condition, i.e., diode Q1 operative.

In the event that diode Q1 is shorted, there would not be a voltage drop thereacross and consequently, the transistor Q3 would turn off, allowing transistor Q4 to be back biased (base to emmitter by resistor R6) which would turn off transistor Q4. This would result in the removal of base current to transistor Q5 and transistor Q5 would be reversed biased by resistor R8 turning transistor Q5 off. With transistor Q5 turned off, the relay K1 will not be energized and this will effect the operation of the alarm device thereby providing an indication that the diode Q1 has failed.

In the event that diode Q1 were to become open circuited, the full half wave voltage would appear across the terminals 76 and 68 of printed circuit board 60. Current would then flow through diode CR5, resistor R4 and diode CR6 reverse biasing transistor Q4 directly. Transistor Q4 would be turned off under this condition although the transistor Q3 is still on. Therefore, transistor Q5 would turn off. With transistor Q5 turned off, the relay K1 will not be energized and this will effect the operation of the alarm device thereby providing an indication that the diode Q1 has failed.

The remaining components of the monitor circuit 10 and their functions in the circuit are as follows: Diode CR7 protects transistors Q3 and Q6 from excessive reverse voltages; Diode CR1 also helps keep reverse voltage from all parts of the printed circuit board 60; Diode CR4 is a free wheeling diode across the coil of relay K1 which reduces the voltage transient on transistor Q5 and helps relay K1 remain energized during the half cycle that no power is applied to the monitor circuit 10.

While the monitor apparatus, in accordance with the invention, has been illustrated in a configuration of two diodes in series, the monitor apparatus may be utilized with any number of diodes in series or with diodes in series - parallel arrangements. All that is required is that an individual monitor circuit of the type illustrated by monitor circuits 10 and 12 be provided for each diode to be tested. Power for a plurality of monitor circuits may be derived from a transformer having a corresponding plurality of secondary windings.

Having thus described our invention, we claim:

1. In a system comprising a rectifier leg including at least first and second series connected rectifier cells and an external circuit arranged to supply electrical power to the rectifier leg, monitor apparatus for providing an indication of open and short circuit failure of the first and second rectifier cells while the first and second rectifier cells are in use in the system and being supplied with electrical power from the external circuit and while they are not in use in the system and are not being supplied with electrical power from the external circuit, the monitor apparatus comprising:
   a. indicating means,
   b. a first monitoring circuit for detecting open and short circuit failure of the first rectifier cell, the first monitoring circuit including first voltage sensing and comparison means operatively associated with the first rectifier cell and being arranged to effect operation of the indicating means when the voltage drop across the first rectifier cell differs a predetermined amount from a preselected reference voltage;
   c. a second monitoring circuit for detecting open and short circuit failure of the second rectifier cell, the second monitoring circuit including second voltage sensing and comparison means operatively associated with the second rectifier cell and being arranged to effect operation of the indicating means when the voltage drop across the second rectifier cell differs a predetermined amount from a preselected reference voltage; and
   d. a source of control power for supplying electrical power to the monitor apparatus including the first monitoring circuit and the first rectifier cell, and the second monitoring circuit and the second rectifier cell, said source of control power being independent of the external circuit arranged to supply electrical power to the rectifier leg.

2. In a system as defined in claim 1 wherein the source of control power comprises a transformer having a primary winding connectable to a source of AC power, a first secondary winding and a second secondary winding, the first secondary winding being wound in opposite direction to that of the second secondary winding and supplying electrical power to the first monitoring circuit and the first rectifier cell associated therewith, and the second secondary winding supplying electrical power to the second monitoring circuit and the second rectifier cell associated therewith.

3. In a system as defined in claim 1 wherein the indicating means comprises an energizable audible alarm device and wherein the first voltage sensing and comparison means includes:
   a. first energizing means for effecting the energization of the audible alarm device;
   b. first switch means operatively connected to the first energizing means, the first switch means being operable between a normally closed circuit condition wherein the first energizing means is ineffective to effect operation of audible alarm device, and an open circuit condition wherein the energizing means is effective to effect operation of the audible alarm device; and
   c. first switch operating means for operating the first switch means to its open circuit condition in response to the voltage drop across the first rectifier cell differing a predetermined amount from the preselected reference voltage.

4. In a system as defined in claim 3 wherein the second voltage sensing and comparison means includes:
   a. second energizing means for effecting the energization of the audible alarm device;
   b. second switch means operatively connected to the second energizing means, the second switch means being operable between a normally closed circuit condition wherein the second energizing means is ineffective to effect operation of the audible alarm device, and an open circuit condition wherein the energizing means is effective to effect operation of the audible alarm device; and
   c. second switch operating means for operating the second switch means to its open circuit condition in response to the voltage drop across the second rectifier cell differing a predetermined amount from the preselected reference voltage.

* * * * *